United States Patent [19]

Abraham et al.

[11] 4,286,437

[45] Sep. 1, 1981

[54] ENERGY SAVING REFRIGERATION SYSTEM

[75] Inventors: Fayez Abraham; Edward Bowman, both of Niles, Mich.

[73] Assignee: Tyler Refrigeration Corporation, Niles, Mich.

[21] Appl. No.: 57,350

[22] Filed: Jul. 13, 1979

[51] Int. Cl.³ ............... F25D 21/06; F25B 39/04; F25B 47/00
[52] U.S. Cl. .................................. 62/151; 62/183; 62/278; 62/DIG. 17
[58] Field of Search ............... 62/DIG. 17, 181, 183, 62/184, 278, 160, 151

[56] References Cited

U.S. PATENT DOCUMENTS

| | | | |
|---|---|---|---|
| 3,234,753 | 2/1966 | Quick | 62/278 |
| 3,427,819 | 2/1969 | Seghetti | 62/278 |
| 3,481,152 | 12/1969 | Seeley | 62/183 |
| 3,786,651 | 1/1974 | Eschbaugh et al. | 62/DIG. 17 |
| 3,916,638 | 11/1975 | Schmidt | 62/160 |
| 4,075,865 | 2/1978 | Wills | 62/183 |
| 4,120,173 | 10/1978 | Kimpel | 62/DIG. 17 |
| 4,122,688 | 10/1978 | Mochizaki et al. | 62/278 |
| 4,193,781 | 3/1980 | Vogel et al. | 62/DIG. 17 |

Primary Examiner—Lloyd L. King
Attorney, Agent, or Firm—LeBlanc, Nolan, Shur & Nies

[57] ABSTRACT

A refrigeration system having an increased efficiency of operation and reduction in power consumption. By maintaining a low head pressure and subcooling the liquid refrigerant emitted from the remote condenser, the efficiency of operation of the compressor of the refrigeration system can be substantially increased. The particular type of refrigeration system of concern generally includes a compressor for compressing a gaseous refrigerant, a condenser for condensing the gaseous refrigerant and subcooling the liquid refrigerant, a receiver for receiving the liquid and a plurality of display cases having evaporators for evaporating the liquid refrigerant. The gaseous refrigerant passing through the condenser is first condensed into a liquid at a condensing temperature of approximately 10° to 25° F. above a preselected cooling temperature. The condensed liquid is then subcooled to the preselected cooling temperature which should be preferably either approximately 50° F. or the temperature of the ambient atmosphere surrounding the condenser, whichever is higher.

32 Claims, 4 Drawing Figures

ENERGY SAVING REFRIGERATION SYSTEM

BACKGROUND OF THE INVENTION

The present invention relates to a closed cycle refrigeration system utilizing a remote condenser and constructed so as to improve the efficiency of operation of the system and reduce the power consumption.

In the basic construction of any closed cycle refrigeration system, the gaseous refrigerant, e.g. freon, is compressed within a compressor so as to be present as a high temperature compressed gas. The compressed gas is then condensed within a condenser into a liquid. The pressure within the condenser is maintained at an appropriate level so that the gaseous refrigerant will be transformed into a liquid at a temperature level higher than the ambient air. Thus, as the gaseous refrigerant passes through the condenser, it can give off heat to the surrounding ambient air. The liquid refrigerant emitted from the condenser is then temporarily stored in a receiver and subsequently passed through an evaporator within a display case. As the liquid passes through the evaporator, it extracts heat from the display case and is converted back into its high temperature gaseous state. This gaseous refrigerant is than again passed through the compressor and the cycle is continued.

Traditionally, the condenser was operated at a preselected design temperature level. Thus, once it was determined what the highest ambient temperature was during a normal period of the warmest season in a particular area, the design temperature for the condenser was set at this level. Then, the condenser was operated so as to condense the gaseous refrigerant at a temperature of at least 10° F. above this design temperature. Consequently, if the design temperature was 90° F., then the condenser temperature was set at 100° F.

Recognizing that the design temperature was only likely to occur a few days in a year, and then only during the day and not at night, the refrigeration systems have been modified so that the condenser temperature followed the path of the ambient temperature while always remaining at least 10° F. above the ambient temperature.

During the operation of the refrigeration system, it is necessary to regulate the pressure within the receiver in order to ensure proper operation of the evaporators. Such regulation has typically been provided by shunting hot gaseous refrigerant from the gas discharge line of the compressor directly into the receiver whenever the relative pressure of the receiver drops by more than a preselected pressure differential from the pressure in the gas discharge conduit. For such purposes, a check valve, typically on the order of 20 or 30 psi, has been provided in the line between the gas discharge conduit and the receiver. Hence whenever the pressure within the receiver drops by more than 20 to 30 psi as compared to the pressure in the gas discharge conduit the check valve opens and allows the hot gas from the gas discharge line to flow directly into the receiver. Since the gaseous refrigerant in the gas discharge conduit is typically of a temperature level of approximately 200° F., such gas acts as a significant heat source to the receiver, a situation which is generally undesirable.

During the refrigeration cycle, the refrigerant absorbs a substantial amount of heat during the evaporation stage, which heat is then dissipated by the condenser as a waste by-product of the refrigeration cycle. In certain refrigeration system, effective use of such heat has been made by employing a gas defrost operation. Such a gas defrost operation utilizes a certain amount of this extra heat by periodically channeling some of the hot compressed gaseous refrigerant back to the evaporator where this heat is then given up by the gaseous refrigerant to defrost the evaporator. Such a system is disclosed in U.S. patent application, Ser. No. 952,612 to Arthur Perez and Fayez Abraham, filed on Oct. 18, 1978 and currently pending, which application is assigned to the same assignee as the present application. The contents of such application is hereby incorporated by reference.

In one type of conventional gas defrost system, superheated gaseous refrigerant is periodically channeled directly from the compressor output into one or more selected evaporator coils for melting the frost accumulated on the coils. Examples of such systems are shown in U.S. Pat. No. 3,138,007 to Friedman, et al. and U.S. Pat. No. 3,150,498 to Blake. Other conventional gas defrost systems remove the super abundance of sensible heat from the compressor discharge gas so that the defrost gas conveyed to a selected evaporator to be defrosted is at or close to the saturation temperature of the refrigerant. Examples of such systems are shown in U.S. Pat. No. 2,895,306 to Latter and U.S. Pat. No. 3,343,375 to Quick. Still, other prior art systems remove both super heat and latent heat from the defrosting refrigerant so that only condensed liquid refrigerant is conveyed to the evaporator to be defrosted such as disclosed in U.S. Pat. No. 3,195,321 to Decker, et al. Another type of system increases the heat content of the defrost gas by means of external electric heaters and the like such as disclosed in U.S. Pat. No. 3,145,602 to Beckwith.

During the operation of such gas defrost systems, the refrigeration cycle is temporarily deactivated and hot gases are then fed through the evaporator coils for defrosting such coils. After the evaporator coils have been sufficiently defrosted, the flow of the gaseous refrigerant is cut off and the evaporator coils are immediately returned to a refrigeration cycle of operation.

Another technique for taking advantage of the heat to be dissipated by the hot gaseous refrigerant is the utilization of a heat recovery coil such as shown in U.S. Pat. No. 4,123,914 to Arthur Perez and Edward Bowman, which patent is assigned to the same assignee as the present application and is hereby incorporated by reference. Such a heat recovery coil allows for extraction of heat from the gaseous refrigerant flowing out of the compressor before entering the remote condenser. Such extracted heat then can be utilized for heating the interior of the building where the refrigeration system is employed. Similar types of systems are disclosed in U.S. Pat. No. 3,905,202 to Taft, et al. and U.S. Pat. No. 4,012,921 to Willitts, et al. These last two patents also disclose the utilization of gas defrost mechanisms within the refrigeration systems.

In the utilization of such refrigeration systems, significant attention has been given, especially in recent years, to improving the power efficiency of the systems. The previously noted patents to Perez, et al. (U.S. Pat. No. 4,123,914), Taft, et al. and Willitts, et al. all discuss various different techniques for attempting to improve the operation of a refrigeration system. In large installations, such as supermarkets, there are typically large numbers of refrigerated display cases and hence, typically a plurality of compressors are employed in order to satisfy the heavy refrigeration load under certain conditions, such as during the warmer portions of the year. The efficiency of the compressors is dependent upon the compression ratio of the discharge side of the compressor to the suction side of the compressor. Thus, by reducing the head pressure at the compressor discharge, the efficiency of operation of the compressor can be increased.

SUMMARY OF THE INVENTION

An object of the present invention is to provide a more efficiently operated refrigeration system.

Another object of the present invention is to provide a refrigeration system capable of increasing the efficiency of operation of the compressors so as to minimize the necessary expenditure of power for running the compressors.

A further object of the present invention is to provide a refrigeration system that effectively and efficiently employs a hot gas defrost system without incurring any unnecessary power consumption to return the evaporators to a stabilized condition at the termination of the defrost cycle.

Still another object of the present invention is to provide a refrigeration system which enables efficient utilization to be made of a heat recovery coil both during colder periods and milder periods of the year without having to reconstruct the system during such periods.

Still a further object of the present invention is to provide a refrigeration system in which the condensed liquid refrigerant before leaving the condenser is subcooled to a temperature below the condensing temperature so as to increase the efficiency of operation of the compressors.

A still further object of the present invention is to provide a refrigeration system in which the liquid refrigerant leaving the condenser is subcooled within the condenser to a temperature below the condensing temperature, with such subcooling temperature being approximately 50° or the ambient temperature, whichever is higher.

Still another object of the present invention is to provide a refrigeration system in which the pressure within the receiver is maintained at a minimum preselected level.

Still a further object of the present invention is to provide a refrigeration system in which the pressure within the receiver is maintained at a minimum preselected pressure level without significantly changing the temperature level of the refrigerant within the receiver.

There are two basic approaches that can be employed in order to improve the efficiency of operation of the copressor. When discussing an improvement in efficiency with respect to the compressor, this is intended to primarily mean that the compressor capacity is increased. When employing a plurality of compressors coupled in tandem, i.e. in parallel, by improving the capacities of the compressors, there are times when less than all of the compressors need to be operated in order to run the refrigeration system. By having to employ less than all of the compressors, there is a savings in the power consumption of the refrigeration system.

By decreasing the condensing temperature 10° F., the compressor capacity will increase 6%. Consequently, if the condenser temperature is dropped from 100° F. to 75° F., the compressor capacity will increase by approximately 15% and simultaneously, the compressor power consumption will be reduced. The effect of the increase in compressor capacity will result in approximately an 8% reduction in power consumption for everey 10° F. drop in condensing temperature, assuming a constant refrigeration load. Consequently, the drop in the condensing temperature from 100° F. to 75° F. will reduce the power consumption by 20%, assuming a constant refrigeration load.

The compressor's efficiency also can be improved by subcooling the liquid refrigerant since the refrigerant will then extract 15 to 25% more heat per pound circulated. For every 10° F. subcooling of the liquid refrigerant, the compressor efficiency will increase by 5%. This improvement in the efficiency of the compressor also results in a reduction in the power consumption.

Another factor tending to increase the consumption of power during the operation of the refrigeration system occurs due to the nature of a gas defrost operation. During such operation, once it is determined that a set time period, e.g., twenty minutes, is necessary to properly defrost the evaporator coils, gaseous refrigerant is supplied to the coils for the entire time period. At the end of the time period, when the defrosting operation has been completed, the flow of gaseous refrigerant is terminated and the normal flow of liquid refrigerant is reinstituted. When the flow of liquid refrigerant does commence, however, there is a certain period of time inherent in the operation for the evaporator coils to return a stable refrigeration condition since the heat provided by the gaseous refrigerant must be dissipated.

In accordance with the present invention, it has been found that it is not mandatory to actually supply the gaseous refrigerant for the entire defrost cycle although the time period for the defrost cycle cannot be necessarily shortened. Thus, by providing the gaseous refrigerant during only a portion of the defrost cycle then interrupting the flow of such gaseous refrigerant, thereby leaving the evaprators free of any flow of refrigerant, an effective defrosting operation still can be carried out. For example, the heated gaseous refrigerant is provided for the first ten minutes of a defrost cycle. Then, the flow of gaseous refrigerant is terminated and condensation from around the evaporator coils is allowed to drain for an additional ten minutes before the flow of liquid refrigerant is reinitiated. At the end of the additional ten minute period, the flow of liquid refrigerant is then reinstituted. During this second period, the heat from the gaseous refrigerant is dissipated and the evaporator coils begin to return to their stabilized refrigeration condition.

The first time period for the gas defrost operation alternatively can be temperature dependent. Thus, instead hot gaseous refrigerant flowing for a preselected time period, the flow of the gaseous refrigerant can continue until the evaporator coil outlet reaches a specific present temperature, e.g. 60° to 70° F. Once the outlet has reached this preselected temperature, then the flow of gaseous refrigerant can be interrupted for a second time period during which the draining of the evaporator coils occurs.

The pressure within the receiver typically has been maintained within a set limited differential with respect to the pressure within the gaseous discharge conduit. This balance has been maintained by shunting the hot gaseous refrigerant from the compressor directly into the receiver. The gaseous refrigerant, however, acts as a heat source to the receiver thereby increasing the temperature of the liquid refrigerant within the receiver and losing some of the effect of the liquid subcooling operation. In order to avoid such problems, several different approaches can be taken. First, while continuing to utilize the hot gaseous refrigerant from the compressor, such gaseous refrigerant can be desuperheated before being supplied to the receiver. The gas should be desuperheated so as to approach either a saturation temperature or a temperature below saturation. In this manner, the receiver can be pressurized without adding a heat source. Such desuperheating can be done by either passing the gaseous refrigerant through a venturi or an orifice thereby dissipating the heat and transforming the liquid refrigerant into a gaseous refrigerant or by refrigerating the gaseous refrigerant as it passes along the interconnecting conduit between the compressor gas discharge conduit and the receiver.

Another approach that can be taken in order to avoid the supply of a heat source to the receiver is the utilization of refrigerant from another section of the refrigeration system. Thus, instead of taking the refrigerant from the gaseous discharge conduit a bypass line from the output of the condenser can be provided for supplying additional liquid to the receiver whenever the receiver pressure drops below a preselected level.

While in most situations the necessity is to prevent the temperature of the liquid refrigerant within the receiver from rising so as to eliminate the subcooling of the liquid, there are occasional situations where heat must be applied to the receiver. In extremely cold climates, care must be taken to ensure that the temperature of the liquid refrigerant does not drop too low. Since the temperature of the liquid refrigerant in the receiver is proportional to the pressure in the receiver, if the temperature of the liquid is too low then the pressure level will be insufficient for proper operation of the system. Consequently, a heat source can be provided for maintaining the temperature of the liquid refrigerant at a preselected minimum temperature, e.g., 50° F. For this purpose, an electric heater can be placed around the receiver which heater will only be energized if the receiver temperature drops below the preselected level.

The particular temperature at which the refrigerant will condense depends on the type of refrigerant utilized. For exmaple, when subcooling the liquid refrigerant to 50° and condensing the refrigerant at a condensing temperature of 60°, for freon R502, the pressure within the condensor should be set at 120 psi. Under the same conditions, the pressure for freon R12 should be at 60 psi. Typically, freon R502 is utilized in freezer refrigeration systems and freon R12 is utilized in medium temperature refrigeration system.

While during normal operation a lower condensing temperature and correspondingly lower pressure within the condenser is employed, there are certain periods of operation when the pressure and temperature of the refrigerant must be increased. If a heat recovery coil is utilized then the temperature of the refrigerant should be appropriately increased so that there is sufficient heat to be extracted from the gaseous refrigerant for the purpose of heating the interior of the building. Similarly, during a gas defrosting operation, the temperature of the gaseous refrigerant must be sufficiently high for enabling proper operation of the defrost cycle. In such situations, the condensing temperature can be increased and the attempts to subcool the refrigerant in the condenser can be temporarily terminated if necessary, which it normally is during the defrost operation.

The above objectives are achieved by the employment of a refrigeration system constructed and operated in accordance with the present invention. The refrigeration system includes: a compressor for compressing gaseous refrigerant, which refrigerant has relatively high temperature and is compressed to a relatively high pressure; a condenser coupled to the compressor for condensing the gaseous refrigerant for changing the gaseous refrigerant into a liquid; a receiver coupled to the condenser for receiving the liquid leaving the condenser and temporarily storing such liquid; and, a plurality of evaporators coupled to the receiver for receiving the liquid refrigerant and evaporating the liquid refrigerant at a relatively low pressure when the evaporators are in a refrigeration mode of operation. In accordance with one aspect of the present invention, after the gaseous refrigerant has been converted into a liquid refrigerant in the condenser, the liuqid refrigerant is subcooled before it leaves the condenser. For this purpose, a mechanism for cooling the refrigerant, e.g., a fan, is provided so as to cool the refrigerant to a temperature of either approximately 50° F. or the ambient temperature of the atmosphere around the condenser, whichever is higher. While a subcooling level of 50° F. is the preferred level, heat only can be rejected from the refrigerant to the ambient atmosphere down to the point when the refrigerant reaches the temperature level of the ambient atmosphere in accordance with the basic laws of thermodynamics. In actual operation, while 50° F. is the desired temperature level, the fan for cooling the remote condenser coil is operated in dependence upon the temperature level of the liquid leaving the condenser. Thus, the fan is activated whenever the temperature of the liquid rises above 55° F. and is then deactivated whenever the temperature level of the liquid falls to 45° F. This span of operation is appropriately modified to a higher level when the ambient temperature is above 50° F. While a lower subcooling temperature, such as 30° F., can be utilized due to the cost of additional insulation that would be needed around the liquid lines and receiver, it becomes uneconomical for most situations.

In order to properly maintain the pressure within the condenser so that the gaseous refrigerant will condense, a pressure regulator is connected to the output conduit from the condenser. This pressure regulator serves to maintain the pressure of the refrigerant in the condenser at a level where the gaseous refrigerant will condense into a liquid at a temperature above the preselected cooling temperature level of the liquid refrigerant leaving the condenser. Typically, the condensing temperature is approximately 10° to 25° F. higher than the preselected cooling temperature level of the liquid refrigerant.

A refrigeration system can include both a remote condenser, which is usually located outside of the building so as to be exposed to ambient air, and a heat recovery condenser which is located within the building so as to give off heat for utilization in heating the building. During portions of the year when heat has to be supplied to the building, the gaseous refrigerant can be circulated through the heat recovery condenser. Air from the building can be circulated over the heat recovery condenser thereby extracting heat from the condenser which heat then is passed into the building. Simultaneously, the extraction of heat from the heat recovery condenser also serves to cool the gaseous refrigerant passing through such condenser. The heat leaving the heat recovery condenser is then passed thorugh the remote condenser where the gaseous refrigerant is actually condensed. Depending on the quantity of the heat that needs to be extracted from the heat recovery condenser, which determines the ideal temperature levels for operation, the cooling mechanism can be deactivated or continue in operation. Thus, if a large quantity of heat is to be extracted from the system for use in heating the building, the cooling mechanism, can be temporarily turned off and the condensing temperature increased to a higher level, for example, 85° F. This increase in the operating temperature will cause parts of the system to run at a higher pressure level and for more heat to be available for extraction from the heat recovery condenser.

During operation of the refrigeration system a plurality of cooling fans can be arranged for utilization for condensing the gaseous refrigerant passing through the remote condenser. The first fan is the fan that is utilized for subcooling the liquid refrigerant. The second fan can be operated in response to the pressure level of the refrigerant passing through the remote condenser, i.e. at a preselected pressure level which is indicative of a higher temperature level of the refrigerant. A third fan can be provided and operated in response to the temperature of the ambient air surrounding the remote condenser. Thus, the third fan is activated when the ambient air rises above a certain preselected temperature level. If additional fans are utilized, such fans can be operated in dependence upon similar factors.

Another aspect of the present invention relates to a refrigeration system employing both a remote condenser and a heat recovery condenser. While during the colder portions of the year, it is desirable to maintain fairly high temperature and pressure levels within the heat recovery condenser, since the increased head pressure and higher temperature level decrease the efficiency of operation of the refrigeration system, it is undesirable to have to maintain these levels during milder seasons of the year. For this reason, in accordance with another aspect of the present invention, a solenoid operated bypass valve can be provided so as to allow the refrigerant to bypass the pressure regulator located at the output of the heat recovery condenser. The pressure regulator is normally set to a relatively high pressure level so as to maintain the pressure and temperature at a sufficiently high level during the coler seasons of the year. By activating the bypass solenoid, however, a portion of the refrigerant flow is drawn off, such as for example one third, and the pressure within the heat recovery condenser is decreased to a lower level. The decrease in the pressure level and hence the temperature of the refrigerant in the heat recovery condenser provides for an improved operating efficiency of the refrigeration system.

In accordance with another aspect of the present invention, a modified gas defrost system can be provided in the basic refrigeration system. This gas defrost system can be utilized both with the refrigeration system employing a mechanism for subcooling the liquid refrigerant leaving the remote condenser and with a refrigeration system without such a subcooling mechanism. In accordance with this refrigeration system, a defrost mechanism is provided which is coupled to the compressor for conducting gaseous refrigerant from the compressor to the evaporators during a defrost cycle of operation. The evaporators can be selectively connected to either the suction manifold which draws off the evaporated refrigerant during the refrigeration cycle or to the defrost mechanism during the defrost cycle. Upon initiation of the defrost cycle of operation, the gaseous refrigerant is supplied to the evaporators and such supply continues for a first time period. The length of this time period can be determined either as a preselected time period or in dependence upon a preselected temperature. Thus, for example, the first time period can be set at 10 minutes or the period can extend until the output from the evaporators being defrosted reaches a temperature of 60° to 70° F. At the termination of the first time period, instead of the evaporators returning to a refrigeration cycle of operation, all flow of refrigerant to the evaporators remains terminated for a second set time period so as to allow the evaporators to drain. At the conclusion of this second time period the refrigeration cycle is then reinitiated.

DESCRIPTION OF THE PREFERRED EMBODIMENTS

The preferred embodiments of the present invention are described in connection with a commercial refrigeration system manufactured by Tyler Refrigeration Corporation, assignee of the present application, under the trade name "SCOTCH TWOSOME" and described in detail in Tyler Installation and Service Manual for Scotch Twosome Condensing Unit Assemblies, Reg. 5/78. It should be understood, however, that the invention is not limited to the Scotch Twosome assembly; the various embodiments of the present invention may be incorporated and are applicable to any closed cycle refrigeration system.

Through the present description, references to "high side" are to the high pressure side of the system (upstream of the metering device) or portion thereof. References to "low side" are to the low pressure side of the system (downstream of the metering device) or portion thereof. The liquid side of the system is generally considered to be between the outlet of the condenser and the metering device. The low pressure gas side or "suction side" lies between the metering device and the compressor. The metering device referred to herein is that device that controls the flow of liquid refrigerant to the evaporators.

Figure 1:
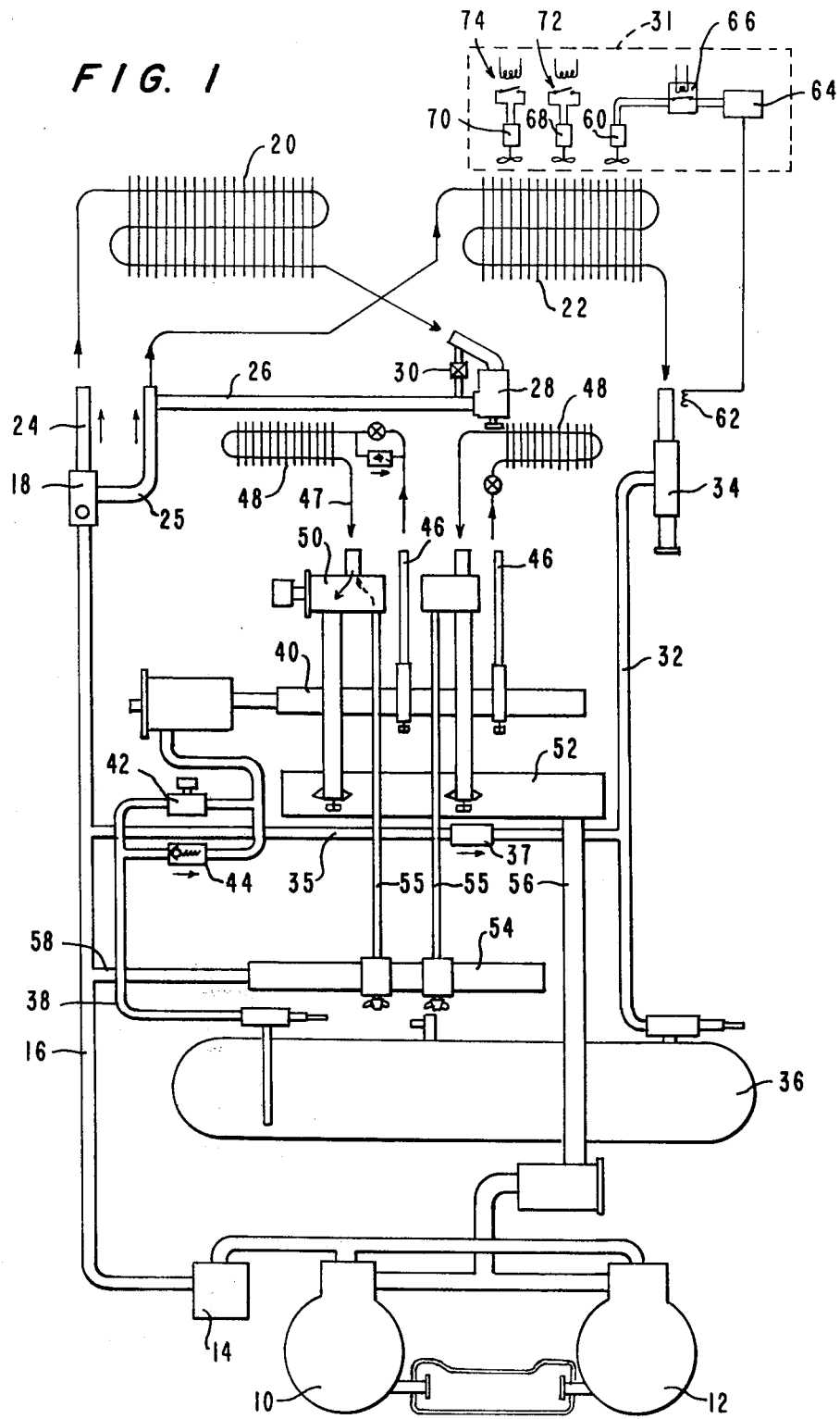
FIG. 1 is a schematic illustration of a first embodiment of a refrigeration system in accordance with the present invention.

As illustrated in FIG. 1, the refrigeration system includes two compressors 10 and 12 which form a Scotch Twosome unit. Compressors 10 and 12 are connected in tandum, i.e. in parallel. The compressor discharge is connected through an oil separator 14 to a main compressor discharge gas conduit 16. A solenoid operated heat recovery valve 18 may advantageously be interposed in conduit 16 so as to selectively connect the heat recovery coil 20 in series flow relationship with a remote condenser 22. Valve 18 connects conduit 16 to the upstream side of coil 20 through a heat recovery branch conduit 24. Valve 18 also connects conduit 16 to the upstream side of remote condenser 22 through a remote condenser conduit 25. The downstream side of heat recovery coil 20 is connected to conduit 25 and hence remote condenser 22 by a conduit 26 that contains a pressure regulator 28.

The downstream side of remote condenser 22 is connected through a conduit 32 and pressure regulator 34 to a receiver tank 36. A liquid line 38 connects the liquid phase of receiver 36 with a liquid manifold 40 through a main liquid solenoid valve 42 and parallel connected check valve 44. One or more liquid lines 46 connect the liquid manifold 40 to each of the remotely located evaporators 48 associated, for example, with respective refrigerated display cases or cold rooms, generally in a store such as a supermarket. The downstream side of each evaporator is connected through a corresponding evaporator return line 47 and a three-way gas defrost valve 50 to a suction manifold 52 and a defrost gas manifold 54. Suction manifold 52 is connected through a suction conduit 56 to the intake of compressors 10 and 12. A branch conduit 58 connects defrost gas manifold 54 with main compressor discharge conduit 16.

Except for the heat recovery coil 20, remote condenser 22, evaporators 48 and their associated connected conduits 46 and 47, all of the above described components may advantageously form part of a unitary package mounted to a main frame or rack located in the compressor room of a store. The respective display cases containing evaporators 48 are located at convenient places throughout the public area of the store or within certain select storage locations within the store. Connecting conduits 46 and 47, therefore, may be between about 50 and 300 feet in length. Remote condenser 22 is usually located on the roof of the store, at a distance of typically between 40 and 100 feet from the compressor room. The heat recovery coil is normally located in the store air in the heat system where it can give out heat to the store air circulation system when desired.

During the refrigeration operation, when the gaseous refrigerant is only flowing through the remote condenser, an attempt is made to subcool the refrigerant after it has been converted into a liquid refrigerant. For this purpose, a cooling unit 31 is provided. Cooling unit 31 includes three fans, 60, 68 and 70. Fan 60 is operable in response to the temperature of the liquid leaving remote condenser 22. Thus, a temperature sensor 62 senses the temperature of the liquid leaving the remote condenser and passes such information to a thermostat 64 for controlling fan 60. Switch 66 serves to disconnect fan 60 whenever the system has been switched into a defrost cycle of operation, as will be explained further below. In order to achieve the maximum benefit of subcooling, the liquid refrigerant should be subcooled to a temperature of between 10° to 25° F. below the condensing temperature. Thus, if the pressure within remote condenser 22 is appropriately regulated so that the gaseous refrigerant is condensed at a temperature of 60° F., fan 60 can be operated for cooling the liquid to a temperature of 50° F. While a lower subcooling temperature might be desirable, due to the cost of extra insulation that would be needed along all of the liquid lines, subcooling to such a low level is generally impractical. The other limitation upon the subcooling operation is the temperature of the ambient atmosphere surrounding the remote condenser. The liquid passing through the condenser cannot be subcooled to a level below the temperature of the ambient air since at that level all heat exchange ceases. In operation, thermostat 64 can serve to turn on fan 60 whenever the temperature of the liquid refrigerant rises above 55° F. and to turn off fan 60 whenever the temperature falls to 45° F. If a higher subcooling temperature than 50° F. is utilized due to a higher ambient temperature, then the operating range is similarly shifted.

Fans 68 and 70 of cooling unit 31 are responsive to other temperature determinations. Fan 68 is switched into an operating condition by relay switch 72 in dependence upon the pressure within the remote condenser. Thus, if the liquid is being subcooled to 50° F., then if the pressure should rise to a level where the temperature of the gaseous refrigerant is above 60° F. fan 68 is activated. Fan 70 is operated in response to the temperature of the ambient atmosphere rising above a certain preselected level. Thus, if the ambient atmosphere, for example, should rise above 70° F., then relay switch 74 activates fan 70.

In order to control the pressure within remote condenser 22 so as to ensure proper condensing the the gaseous refrigerant, a pressure regulator 34 is provided. Pressure regulator 34 is arranged between remote condenser 22 and condensed liquid conduit 32. The liquid flowing through the regulator flows into conduit 32 and from there into receiver 36.

In order to ensure proper operation of the system, the pressure within receiver 36 should be maintained at an appropriately selected minimum pressure level, for example, 105 psi for freon R502. This pressure level, however, will vary depending on the type of freon utilized and the operating conditions and the size of the system. In order to ensure that the preselected pressure level is maintained, gaseous refrigerant from the compressors can be supplied through gas line 35 to the receiver whenever the pressure drops below the preselected level. An appropriate valve 37 which opens whenever the pressure within receiver 36 drops below the preselected level enables a flow of gaseous refrigerant along conduit 35 into conduit 32 and from there into receiver 36.

Figure 4:
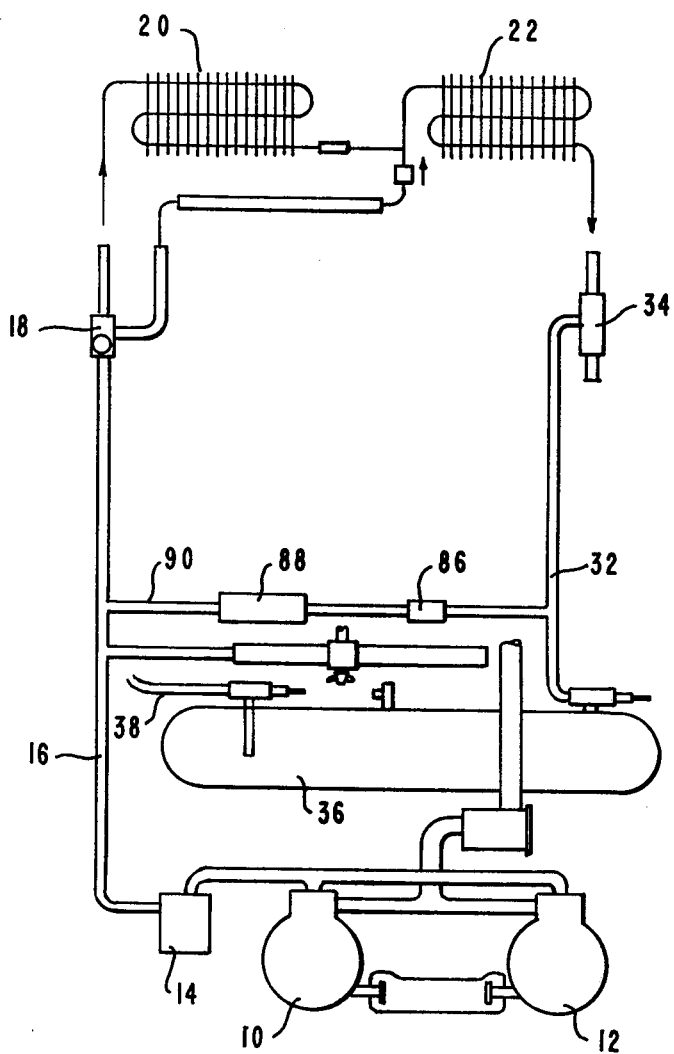
FIG. 4 is a schematic illustration of a portion of a fourth embodiment of a refrigeration system in accordance with the present invention.

Since the gaseous refrigerant leaving the compressors is at an extremely high temperature, on the order of 200° F., it is undesirable to supply such gaseous refrigerant directly into the receiver, where the liquid refrigerant is ideally of a temperature of approximately 50° F. The supply of the gaseous refrigerant will raise the temperature of the liquid refrigerant in the receiver and negates the advantages of subcooling such refrigerant. Accordingly, if the gaseous refrigerant is to be utilized for maintaining the pressure in receiver 36, the gaseous refrigerant should be cooled prior to being supplied to the receiver. Thus, as shown in FIG. 4, along conduit 90 that interconnects conduits 16 and 32 for supplying refrigerant to receiver 36, a mechanism 88 can be provided for cooling the gaseous refrigerant. Mechanism 88 can be a venturi or a refrigerated coil which will serve to cool the gaseous refrigerant. The cooled refrigerant then passes through a valve 86 whenever the pressure within receiver 36 drops below a preselected level.

Figure 2:
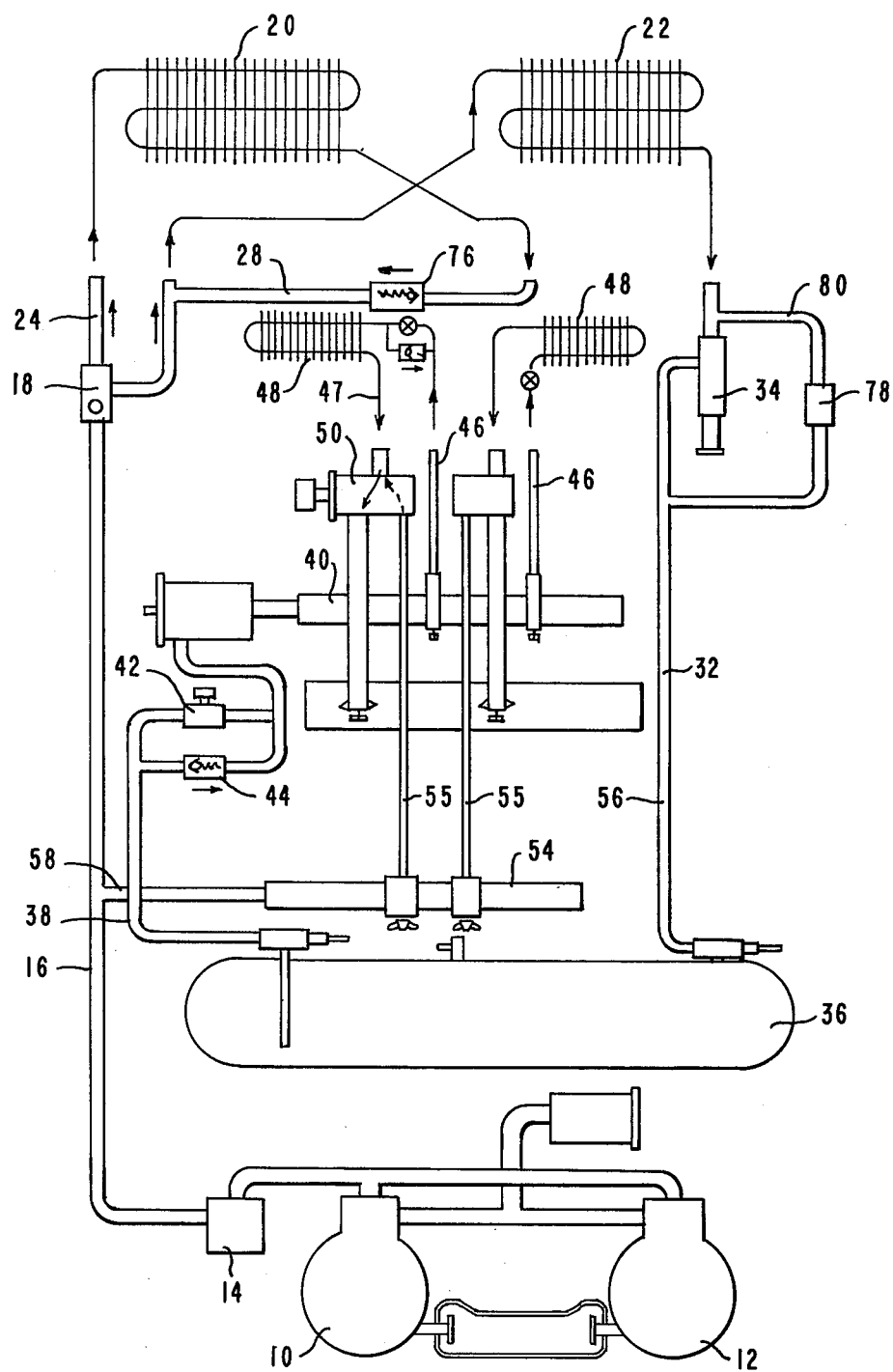
FIG. 2 is a schematic illustration of a second embodiment of a refrigeration system in accordance with the present invention.

Alternatively, instead of supplying gaseous refrigerant from the output of the compressors, refrigerant that has already been partially cooled by having passed through the heat recovery coil 20 can be supplied to the receiver whenever the pressure drops below a preselected level. Another alternative embodiment, which is illustrated in FIG. 2, is to include a bypass around pressure regulator 34 for supplying additional condensed refrigerant from remote condenser 22 whenever the pressure level within receiver 36 drops below the preselected level. For this purpose, a bypass line 80 with a valve 78 is provided. The valve 78 opens for enabling the bypass flow when the pressure in receiver 36 drops below the preselected level.

During colder portions of the year, it is desirable to make effective use of the heat of the gaseous refrigerant. For this purpose, the gaseous refrigerant can be passed through the heat recovery coil and heat extracted for circulation through the interior of the building in which the refrigeration system is located. Thus, if the heat recovery coil is to be used, valve 18 circulates the gaseous refrigerant along conduit 24 instead of conduit 25. The gaseous refrigerant after passing through the heat recovery coil flows along conduit 26 to the remote condenser. In order to maximize the efficiency of the heat recovery coil, the pressure within the coil should be maintained at a fairly high level thereby maintaining the high temperature of the gaseous refrigerant. For this purpose, pressure regulator 28 is included along conduit 26 for regulating the pressure in coil 20. During certain milder seasons of the year, although extraction of heat from heat recovery coil 20 is desirable, only a lower level of heat is needed. Accordingly, a bypass solenoid 30 can be provided for enabling the refrigerant to circumvent regulator 28. When solenoid 30 is open, a portion, for example one-third, of the heat of rejection will be recovered to the stove. This effectively causes a drop in the pressure and hence temperature of the gaseous refrigerant in heat recovery coil 20.

During the normal refrigeration operation, liquid refrigerant flows through liquid manifold 40 into evaporator 48. The evaporated refrigerant then flows through three-way valve 50 into suction manifold 52. The evaporated refrigerant from suction manifold 52 is then returned to the compressors through suction conduit 56. During the defrost cycle of operation, however, the flow of liquid refrigerant is terminated temporarily and gaseous refrigerant is supplied to evaporator coil 48. Thus, gaseous refrigerant is supplied along conduit 58 to gas defrost manifold 54 from which it is then fed through defrost gas conduit 55 into three-way valve 50. Three-way valve 50 then directs the defrost gas into evaporator 48.

Figure 3:
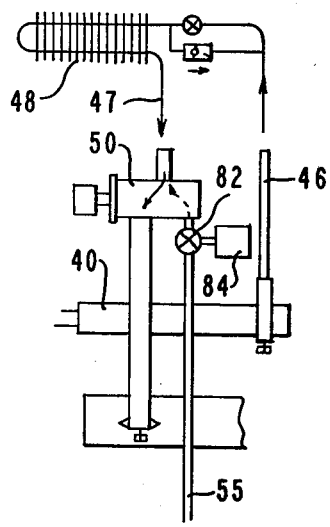
FIG. 3 is a schematic illustration of a portion of a third embodiment of a refrigeration system in accordance with the present invention.

After the defrost gas has been supplied to evaporator 48 for a first period of time, the flow is terminated by a solenoid 82, such as shown in FIG. 3. This first period of time can be either a preselected time period or can be dependent upon the outlet temperature from the evaporator coil. The time period and the operation of solenoid 82 is controlled by time control mechanism 84. Once the first period of time has expired, the flow of the defrost gas is terminated but three-way valve 50 is not returned to a condition for enabling a refrigeration cycle to take place. Thus, for a second time period there is no flow of any refrigerant to evaporator coil 48. Both the first and second time period can each be on the order of approximately 10 minutes for medium temperature display cases.

The present invention may be embodied in other specific forms without departing from the spirit or essential characteristics thereof. The present embodiments are presented merely as illustrative and not restrictive, with the scope of the invention being indicated by the claims rather than the foregoing description. All changes which come within the meaning and range of equivalency of the claims are therefore intended to be embraced therein.

What is claimed is:

1. A refrigeration system comprising:
compressor means including at least one compressor unit, said compressor means compressing gaseous refrigerant having a relatively high temperature to a relatively high pressure;
condenser means coupled to said compressor means for condensing said gaseous refrigerant at a preselected condensing temperature, for transferring the gaseous refrigerant into a liquid, said condenser means including:
subcooling means for cooling the refrigerant ideally to a preselected liquid temperature level significantly lower than the condensing temperature when the refrigerant passes through said condenser means so that the liquid leaving said condenser means is subcooled and
temperature sensing means for sensing the temperature of the liquid leaving said condenser means and controlling the operation of said subcooling means for cooling the refrigerant in dependence upon the temperature of the liquid;
a receiver coupled to said condenser means for receiving the subcooled liquid leaving said condenser means and temporarily storing such liquid; and,
evaporator means coupled to said receiver for receiving liquid refrigerant from said receiver and for evaporating the liquid refrigerant at a relatively low pressure when said evaporator means is in the refrigeration mode of operation.

2. A refrigeration system according to claim 1 wherein said means for cooling the refrigerant is operated so as to ideally cool the refrigerant to a temperature of between 30° F. and 50° F. but a minimum being the ambient temperature, with such temperature being at least 10° F. below the condensing temperature.

3. A refrigeration system according to claim 2 wherein said means for cooling the refrigerant is operated for cooling the refrigerant to a temperature of higher than approximately 45° F.

4. A refrigeration system according to claim 3 wherein said means for cooling the refrigerant cools the refrigerant to a temperature of approximately 50° F.

5. A refrigeration system according to claim 1, 2, 3 or 4 further comprising a pressure regulating means coupled between said condenser means and said receiver, said pressure regulating means serving to maintain the pressure of the refrigerant in said condenser means at a level where the gaseous refrigerant will condense into a liquid at a temperature above the preselected cooling temperature level of the liquid refrigerant leaving said condenser means.

6. A refrigeration system according to claim 5 wherein the condensing temperature is approximately 10° to 25° F. higher than the preselected cooling temperature level for the liquid refrigerant.

7. A refrigeration system according to claim 1 wherein said compressor means includes two compressors coupled in tandem and said means for cooling the refrigerant sufficiently subcools the refrigerant for increasing the capacity of said compressors so that during the majority of the operating time of said refrigeration system only one of said two compressors needs to be operating.

8. A refrigeration system according to claim 1, 2, 3, 4 or 7 wherein said condenser means includes a remote condenser to be located so that it is exposed to ambient air from outside of a building in which said refrigeration system is to be installed and a heat recovery condenser to be located within the building and said means for cooling the refrigerant only cools refrigerant passing through said remote condenser; and further comprising: means for causing the gaseous refrigerant to normally flow only through said remote condenser and to flow through both said heat recovery condenser and said remote condenser when heat from said condenser means is to be utilized to help heat the building.

9. A refrigeration system according to claim 5 wherein said condenser means includes a remote condenser to be located for exposure to ambient air from outside of a building in which said refrigeration system is to be installed and a heat recovery condenser to be located within the building, said means for cooling the refrigerant only cools the refrigerant passing through said remote condenser and said heat recovery condenser is located upstream of said remote condenser; and further comprising: means for causing the gaseous refrigerant to normally flow only through said remote condenser and to flow through both said heat recovery condenser and said remote condenser when heat from said condenser means is to be utilized to help heat the building.

10. A refrigeration system according to claim 9 wherein whenever said heat recovery condenser is in operation, said pressure regulating means is set to a higher condensing temperature.

11. A refrigeration system according to claim 9 wherein said means for cooling is a first air circulating means for circulating ambient air across said remote condenser; and further comprising a second air circulating means operable in response to the pressure level of the refrigerant within said remote condenser and a third air circulating means operable in response to the temperature of the ambient air surrounding said remote condenser.

12. A refrigeration system according to claim 10 further comprising condenser pressure regulating means coupled between said heat recovery condenser for maintaining the pressure of the refrigerant within said heat recovery condenser at a pre-selected level and bypass means for allowing refrigerant within said heat recovery condenser to bypass said condenser pressure regulating means and flow directly from said heat recovery condenser to said remote condenser during milder seasons of the year when less heat is needed thereby reducing the pressure and temperature of the gaseous refrigerant in said heat recovery condenser.

13. A refrigeration system accordig to claim 1 further comprising gas defrost means coupled to said compressor means for conducting gaseous refrigerant from said compressor means to said evaporator means for defrosting said evaporator means.

14. A refrigeraton system according to claim 1 further comprising means for maintaining the pressure of the liquid refrigerant in said receiver at a preselected level.

15. A refrigeration system including a gas defrost mechanism, said system comprising:
compressor means for compressing gaeous refrigerant having a relatively high temperature to a relatively high pressure;
condenser means coupled to said compressor means for condensing the gaseous refrigerant to a liquid;
a plurality of evaporator means coupled in parallel for evaporating the liquid refrigerant at a relatively low pressure;
suction means for returning evaporated refrigerant from said evaporator means to said compressor means;
defrost means coupled to said compressor means for conducting gaseous refrigerant from said compressor means to said evaporator means;
means for selectively connecting the low pressure side of said evaporator means to said suction means and said defrost means in dependence upon whether said evaporator means is selected to be in a regrigeration mode or defrost mode of operation, respectively; and
flow period control means for enabling the flow of gaseous refrigerant to said evaporators during a defrost mode of operation, when selected, and after a first time period terminating such flow while preventing said evaporator means from returning to the refrigeration mode of operation for a second set time period of a sufficient duration so as to allow for condensation around said evaporator means to drain.

16. A refrigeration system according to claim 15 wherein said condenser means includes means for cooling the refrigerant ideally to a preselected liquid temperature level when the refrigerant passes through said condenser means so that the liquid leaving said condenser means is subcooled and temperature sensing means for sensing the temperature of the liquid leaving said condenser means and controlling the operation of said means for cooling the refrigerant in dependence upon the temperature of the liquid, said means for cooling is capable of being terminated during a defrost cycle of operation.

17. A refrigeration system according to claim 16 wherein said means for cooling the refrigerant is operated so as to cool the regrigerant to a temperature of higher than approximately 45° F.

18. A refrigeration system according to claim 17 further comprising a pressure regulating means coupled between said condenser means and said receiver, said pressure regulating means serving to maintain the pressure in said condenser means at a level where the gaseous refrigerant will condense to a liquid at a temperature above the preselected cooling temperature level for the liquid leaving said condenser means.

19. A refrigeration system according to claim 18 wherein said condenser means includes a remote condenser to be located for exposure to ambient air from outside of a building in which said refrigeration system is to be installed and a heat recovery condenser to be located within the building and said means for cooling the refrigerant only cools refrigerant passing through said remote condenser; and further comprising means for causing the gaseous refrigerant to normally flow only through said remote condenser and to flow through both said heat recovery condenser and said remote condenser when heat from said condenser means is to be utilized to help heat the building.

20. A refrigeration system according to claim 15, 16, 17 or 18 wherein said flow control means includes a three-way valve means having a first terminal coupled to said suction means for enabling refrigerant to be drawn from said evaporator means, a second terminal coupled to said defrost means for enabling the flow of gaseous refrigerant to said evaporator means and a third terminal coupled to said evaporator means and a solenoid valve means coupled between said defrost means and said three-way valve for terminating the flow of gaseous refrigerant to said evaporator means at the end of the first time period.

21. A refrigeration system comprising:
compressor means for compressing gaseous refrigerant having a relatively high temperature to a relatively high pressure;
condenser means coupled to said compressor means for condensing said gaseous refrigerant, for transferring the gaseous refrigerant into a liquid, said condenser means including a remote condenser to be located so that it is exposed to ambient air from outside of a building in which said refrigeration system is to be installed and a heat recovery condenser to be located with the building;
a receiver coupled to said condenser means for receiving the liquid leaving said condenser means and temporarily storing such liquid;
evaporator means coupled to said receiver for receiving liquid refrigerant from said receiver and evaporating the liquid refrigerant at a relatively low pressure when said evaporator means is in the refrigeration mode of operation;
means for causing the gaseous refrigerant to normally flow only through said remote condenser and to flow through both said heat recovery condenser and said remote condenser when heat from said condenser means is to be utilized to help heat the building; and,
condenser pressure regulated means coupled between said heat recovery condenser for maintaining the pressure of the refrigerant within the heat recovery condenser at a preselected level and bypass means for allowing refrigerant from within the heat recovery condenser to bypass said condenser pressure regulating means and flow directly from said heat recovery condenser to said remote condenser for reducing the pressure and temperature of the gaseous refrigerant in said heat recovery condenser, such bypass means primarily being utilized durig milder seasons of the year when less heat is needed.

22. A refrigeration system according to claim 21 wherein said condenser means is operated so that the gaseous refrigerant condenses to a liquid at a temperature of above approximately 60° F. and said condenser means includes means for subcooling the refrigerant to a temperature significantly lower than the condensing temperature when the refrigerant passes through said condenser means so that the liquid leaving said condenser means is subcooled.

23. A refrigeration system according to claim 22 further comprising gas defrost means coupled to said compressor means for conducting gaseous refrigerant from said compressor means to said evaporator means for defrosting said evaporator means.

24. A refrigeration system comprising:
compressor means for compressing gaseous refrigerant having a relatively high temperature to a relatively high pressure;
condenser means coupled to said compressor means for condensing the gaseous refrigerant to a liquid at a preselected condensing temperature, said condenser means including means for subcooling the liquid refrigerant to a temperature substantilly lower than the condensing temperature;
receiver means coupled to said condenser means for receiving the subcooled liquid leaving said condenser means and temporarily storing such liquid;
a plurality of evaporator means coupled in parallel for receiving liquid refrigerant from said receiver means and evaporating the liquid refrigerant at a relatively low pressure;
suction means for returning evaporated refrigerant from said evaporator means to said compressor means; and,
means for maintaining the pressure in said receiver means at a preselected level.

25. A refrigeration system according to claim 24 further comprising a pressure regulating means coupled between said condenser means and said receiver, said pressure regulating means serving to maintain the pressure of the refrigerant in said condenser means at a level where the gaseous refrigerant will condense into a liquid at a temperature above a preselected temperature level of the subcooled liquid refrigerant leaving said condenser means.

26. A refrigeration system according to claim 25 wherein said condensing temperature is approximately 10° to 25° F. higher than the preselected cooling temperature level for the liquid refrigerant.

27. A refrigeration system according to claim 24, 25 or 26 wherein said compressor means includes two compressors coupled in tandem and said means for cooling the refrigerant sufficiently subcools the refrigerant for increasing the capacity of said compressors so that during the majority of the operating time of said refrigeration system only one of said two compressors needs to be operating.

28. A refrigeration system according to claim 25 or 26 wherein said condenser means includes a remote condenser to be located for exposure to ambient air from outside of a building in which said refrigeration system is to be installed and a heat recovery condenser to be located within the building, said means for subcooling the refrigerant only cools the refrigerant passing through said remote condenser and said heat recovery condenser is located upstream of said remote condenser; and further comprising; means for causing the gaseous refrigerant to normally flow only through said remote condenser and to flow through both said heat recovery condenser and said remote condenser when heat from said condenser means is to be utilized to help heat the building.

29. A refrigeration system according to claim 28 wherein whenever said heat recovery condenser is in operation, said pressure regulating means is set to a higher condensing temperature and said means for subcooling the refrigerant is turned off.

30. A refrigeration system according to claim 28 wherein said means for subcooling is a first air circulating means for circulating ambient air across said remote condenser; and further comprising a second air circulating means operable in response to the pressure level of the refrigerant within said remote condenser and a third air circulating means operable in response to the temperature of the ambient air surrounding said remote condenser.

31. A refrigeration system according to claim 24 wherein said means for maintaining the pressure in said receiver means includes means for supplying gaseous refrigerant from said compressor means to said receiver means whenever the pressure in said receiver means drops below the preselected level and means for desuperheating such gaseous refrigerant before it is supplied to said receiver means.

32. A refrigeration system according to claim 24 wherein said means for maintaining the pressure in said receiver means includes means for supplying liquid refrigerant from said condenser means by bypassing said pressure regulating means whenever the pressure in said receiver means drops below the preselected level.

* * * * *